(12) United States Patent
Jain et al.

(10) Patent No.: US 12,105,727 B2
(45) Date of Patent: Oct. 1, 2024

(54) UNIFIED SEARCH FOR DUAL DOMAINS

(71) Applicant: Microsoft Technology Licensing, LLC, Redmond, WA (US)

(72) Inventors: Parul Jain, Cupertino, CA (US); Brian Hung-Chung Leung, Chicago, IL (US); Fenglin Li, Santa Clara, CA (US); Zheng Li, San Jose, CA (US); Shidong Yan, Newark, CA (US); Xie Lu, Sunnyvale, CA (US); Tao Zheng, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/558,875

(22) Filed: Dec. 22, 2021

(65) Prior Publication Data

US 2023/0195745 A1 Jun. 22, 2023

(51) Int. Cl.
*G06F 16/25* (2019.01)
*G06F 16/22* (2019.01)
*G06F 16/2457* (2019.01)

(52) U.S. Cl.
CPC ............ *G06F 16/256* (2019.01); *G06F 16/22* (2019.01); *G06F 16/24578* (2019.01); *G06F 16/258* (2019.01)

(58) Field of Classification Search
CPC ...... G06F 16/256; G06F 16/22; G06F 16/258; G06F 16/24578

USPC ........................................................ 707/770
See application file for complete search history.

(56) References Cited

U.S. PATENT DOCUMENTS

| | | | |
|---|---|---|---|
| 2010/0299336 A1* | 11/2010 | Bergstraesser | G06F 16/951 705/14.54 |
| 2017/0091343 A1* | 3/2017 | Shorina | G06F 16/9038 |
| 2017/0098012 A1* | 4/2017 | Zhu | G06F 16/9535 |
| 2018/0196881 A1* | 7/2018 | Lundin | G06F 16/9535 |
| 2019/0171728 A1* | 6/2019 | Wakankar | G06F 16/90324 |
| 2021/0334305 A1* | 10/2021 | Thakkar | G06F 16/435 |
| 2021/0406268 A1* | 12/2021 | Ho | G06F 16/24573 |

* cited by examiner

*Primary Examiner* — Hosain T Alam
*Assistant Examiner* — Saba Ahmed
(74) *Attorney, Agent, or Firm* — KDW FIRM PLLC (57) ABSTRACT

Methods, systems, and computer programs are presented for providing a unified search tool for searching data in multiple domains. One method includes an operation for causing presentation of a user interface (UI) for entering one or more search parameters to search items in two or more domains. Each domain is owned by a different entity and data for each domain is acquired by the corresponding entity. Further, the method includes operations for receiving one or more search parameters values, searching, in response to the received search parameter values, the two or more domains based on the search parameters values, and ranking separately search results for each domain. Further, the method includes causing presentation in the UI of the search results for the two or more domains based on the ranking, the search results for each domain being presented in a separate results list.

16 Claims, 9 Drawing Sheets

UNIFIED SEARCH FOR DUAL DOMAINS

TECHNICAL FIELD

The subject matter disclosed herein generally relates to methods, systems, and machine-readable storage media for searching in multiple domains.

BACKGROUND

Oftentimes, users must perform searches on separate databases to find what they are looking for, where the databases store similar information. For example, a first database is maintained by a service provider to store data about people accessing the service of the service provider. A second private database is maintained internally to keep data about known users, and information about users may exist in the first database, the second database, or in both.

Therefore, the search process may be tedious and expensive because the searcher must perform multiple searches and then combine the results from the separate databases.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to providing a unified search tool for searching data in multiple domains. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, an online service, provided by an online service provider, presents a unified search interface for receiving search queries from a user (referred to herein as a searcher or recruiter) that cause the simultaneous search of multiple databases, such as a database provided by the online service and a privately-owned database owned by the entity associated with the searcher. The online service searches both databases, determines results overlap, and presents the results from the search in the user interface.

In one aspect, the searcher is a recruiter searching for candidates in a database of the online service and a database owned by the company of the recruiter. The online service provides tools to import the data from the privately-owned database so that the unified-search interface can be provided.

As used herein, each database is associated with a domain, and each domain is owned by a different entity. The data for each domain is acquired separately and independently by a different entity. Each item stored in the domains may be duplicated in several domains, at least in part (e.g., data for one user may be stored in several domains although the details for the user data may vary across the domains), or may be stored in one of the domains. The unified search is performed in response to a single command to search the databases of the multiple domains.

The embodiments presented herein are described with reference to a database of users from an online service and a database of users maintained by a separate company. The recruiter is able to access the unified search interface to enter queries that search the online service database and the privately-owned database to get information about possible candidates for a job. However, the principles presented herein may be applied to any other type of search, to simultaneous searches for more than two databases, and to searches for different types of items (e.g., products, news, email, friends, social media, etc.).

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, e.g., a professional network, an interest-based network, or any online networking system that permits users to join as registered members. For the purposes of this description, registered members of a connections network may be referred to as simply members. Further, some connections networks provide services to their members (e.g., search for jobs, search for candidates for jobs, job postings) without being a social network, and the principles presented herein may also be applied to these connection networks.

One general aspect includes a method that includes an operation for causing presentation of a user interface (UI) for entering one or more search parameters to search items in two or more domains. Each domain is owned by a different entity and data for each domain is acquired by the corresponding entity. Further, the method includes operations for receiving one or more search parameter values, searching, in response to the received search parameter values, the two or more domains based on the search parameters values, and ranking separately search results for each domain. Further, the method includes causing presentation in the UI of the search results for the two or more domains based on the ranking, the search results for each domain being presented in a separate results list.

Figure 1:
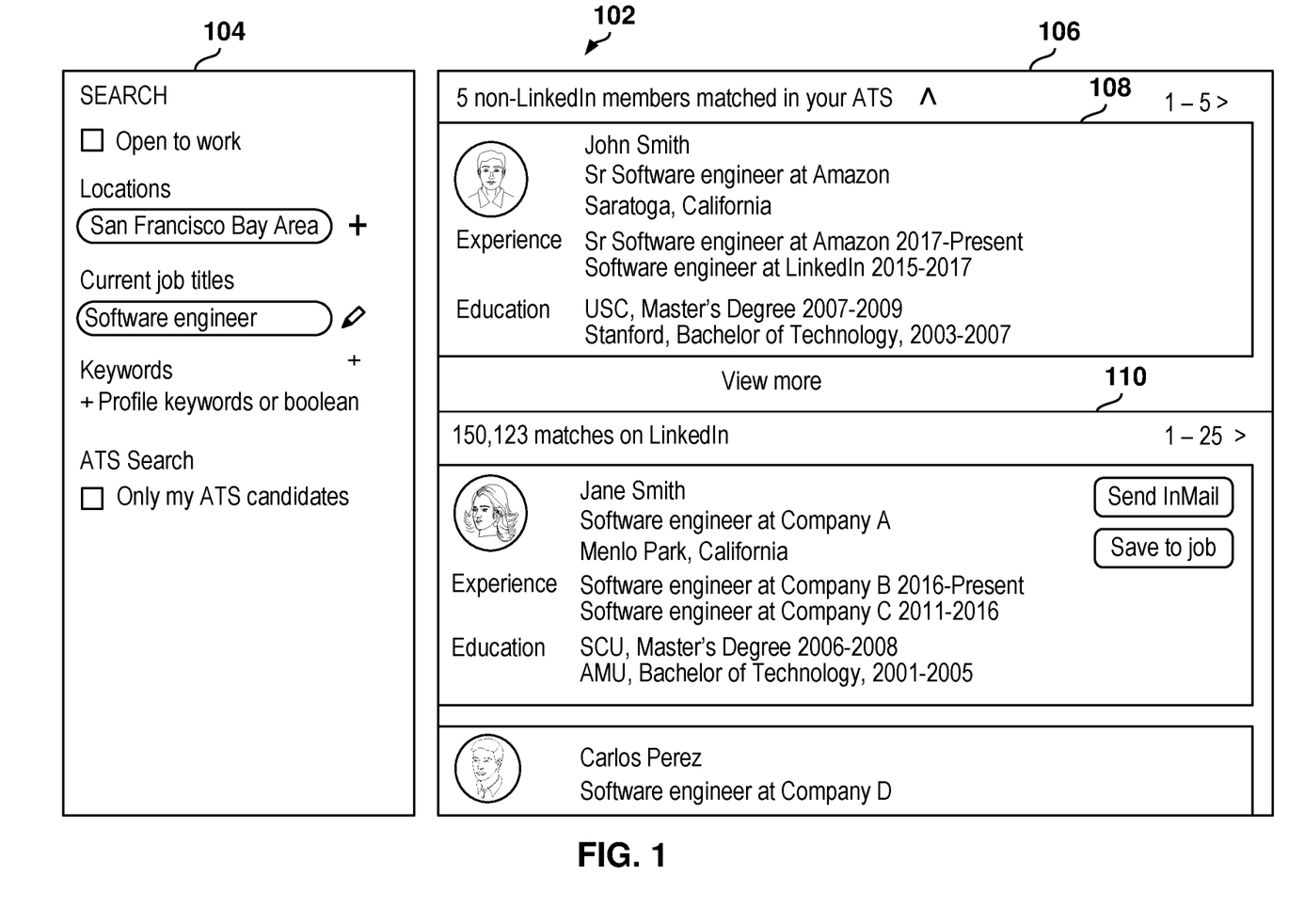
FIG. 1 is a user interface for searches that provides filter options, according to some example embodiments.

FIG. 1 is a user interface (UI) 102 for searches that provides filter options, according to some example embodiments. The UI 102 includes a search panel 104 to enter the search parameters. The searcher may use various methods to find potential candidates for employment referrals.

The search panel 104 includes several options for entering parameters for the search. In some example embodiments, the search options include a selection box to filter for members that have indicated they are open to work, a location area for entering one or more geographic areas where the candidate resides, a current job title area for entering one or more job titles of the member, a keyword area for entering search parameters in the form of text, and a selection box to specify that only ATS candidates are to be searched.

ATS refers to the applicant tracking system of the entity associated with the recruiter. The online service provides utilities for importing ATS data from the recruiter's database to be stored within the online service. After importing the ATS data, the recruiter is able to search for ATS candidates from within the UI 102 provided by the online service. More details about ATS are provided below with reference to FIG. 2.

In some embodiments, more than one search filter value may be selected, and the search results may be filtered to include either the union or the intersection of the selected filter values (e.g., adding the selected filter values with a logical AND or with a logical OR). In some example embodiments, each of the selected filter values within a filter category are combined using a logical OR function, but the selected filter values from the different categories are combined using a logical AND function. Other combinations are also possible, such as using logical AND combinations for combining filter categories and filter values within each of the filter categories.

The UI 102 further includes a search results area 106 for presenting the results from the search specified in the search panel 104. The results include candidates that match the search query and are ranked based on the degree in which they match the requirements of the search query.

In some example embodiments, the results include a first results area 108 for presenting ATS candidates, also referred to herein as ATS members, without matching profiles on the online service, and a second results area 110 for presenting the results from the online service. In other example embodiments, the results may be presented as a single list with flags identifying the status of the member regarding presence in the online service, ATS, or both. When a person is both an ATS candidate and a member of the online service, the person is presented in the second results area 110. In other embodiments, the person may be presented in the first results area 108 or in both the first results area 108 and the second results area 110.

The UI 102 provides options for scrolling through the first results list and the second results list independently. Further, the UI 102 allows the user to close one of the results lists to view the one of the first results or the second results.

The candidate information, in each list of results, is presented for the candidates, including information from the profile of the user, such as name, profile image, current job title, current job location, experience, education, etc.

In the results from the online service, multiple buttons are provided to send a message (referred to herein as an InMail) in the online service to the member, and to "Save to job" to save the member in a list of members kept by the recruiter for the job opening.

In some example embodiments, the lists of candidates are sorted according to the relevance based on the search criteria. Other embodiments may utilize different sorting criteria, such as sorting based on the connection degree to the searching user or the hiring organization.

The UI 102 provides a single search interface for searching simultaneously results from two different data sets: a data set owned by the online service, and a dataset owned by the entity of the recruiter. The results from both datasets are presented simultaneously. This way, the recruiter does not have to perform searches on two different systems and then have to merge the results manually. This represents great savings in recruiter's time, better user of computer resources, and improvement on the quality of results because of the comprehensive view on the data from the two different domains.

It is noted that there may be some candidates present in both the online service and the ATS, referred to as overlap members. In the illustrated example, the overlap members are presented in the results section for the online service, but in other embodiments, the overlap members may be presented in the ATS list, or in both lists. Typically, the user profiles in the online service tend to have more data than on the ATS system, and this is why presenting these users in the online service list usually provides more information about the candidate.

Figure 2:
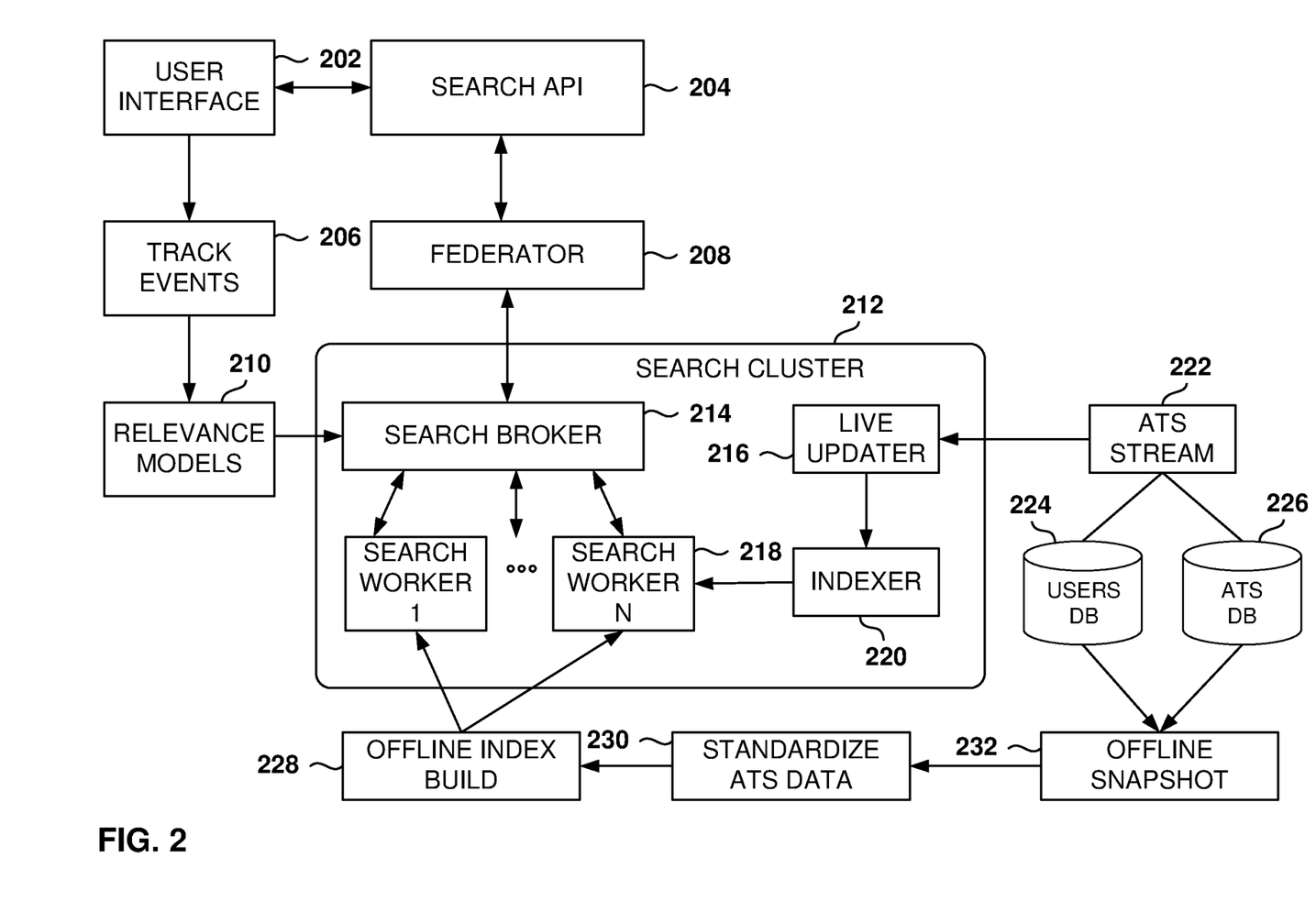
FIG. 2 is a system architecture for unified search, according to some example embodiments.

FIG. 2 is a system architecture for unified search, according to some example embodiments. In some example embodiments, the online service provides an ATS solution that allows the recruiter to manage the recruiting process in a single platform. In general, the ATS handles multiple tasks, such as candidate screening, interview scheduling, reference checks, and administering new-hire documentation.

For example, the ATS allows the recruiter to post a job and immediately source quality candidates using the recruiter tools from the online service, keep track of applicants, and manage the hiring process in one place, while spending quality time building candidate relationships instead of performing tedious administrative tasks.

Further, the ATS integration provides real-time data and insights, such as identify candidates who fit the requirements within the online service community, provide a full view of the talent pool to guide the hiring strategy, give tailored candidate-search results, and access insights on the entire recruiting workflow.

In some example embodiments, the online service provides an application programming interface (API) for importing the ATS data. The recruiter's system makes calls to the API for downloading the data into the online service. Further, a unified search widget is provided so the recruiter may embed the widget in his ATS system or a webpage to make calls to the unified search of the online service. The unified search widget causes the presentation of the search UI 202. A widget refers to a GUI (graphical user interface) element or a tiny application that can display information or interact with the user. A widget can be as rudimentary as a button, scroll bar, label, dialog box or check box; or it can be something slightly more sophisticated like a search box, a small map, a clock, etc.

After the recruiter enters the search parameters, the UI 202 transfers the query via a search API 204, (e.g., an API provided by the online service for talent searches), to the federator 208 that coordinates the search operations and returns the result back for presentation on the UI 202. In some example embodiments, the federator 208 may fetch additional context data for the received search parameters (e.g., information about the recruiter, information about the job openings of the recruiter) and rewrite the query to include the additional data. Additionally, the federator may also filter results before presenting the results in the UI 202.

The search cluster 212 executes the search and returns the results. The search cluster 212 includes a search broker 214, a live updater 216, one or more search workers 218, and an indexer 220. The search broker 214 analyzes the query sent by the federator 208 and divides the search operations into one or more of the search workers 218. For example, each search worker 218 is tasked with searching a portion of the data in the databases. By dividing the work into multiple workers, the search results may be obtained faster because each worker can work in parallel while searching a particular fragment of the database.

Each search worker 218 performs the corresponding search and ranks the results according to relevance. The results are returned to the search broker 214 which groups the results from the search workers 218 and ranks the combined results before returning the results to the federator 208. In some example embodiments, there are 32 search workers, although the number of search workers may change over time. Each search worker 218 ranks the results obtained by the search worker 218 using one or more relevance models 210, and then each search worker 218 provides the top 25 results according to the ranking (although a different number of top search results may also be returned).

In some example embodiments, there are two databases: a users database 224, that stores user information from the online service, and an ATS database 226 that stores the imported ATS data.

In some example embodiments, there is an index to search the database for the user data (e.g., indexing on name, email address, phone number). The index is initially built offline by the offline index build module 228. The index is updated when new changes are detected on the database that are reported by the live updater 216. The indexer 220 indexes the data obtained since the last time the offline index was built. That is, as additional data is received, the indexer updates the index so the newest data may also be found when performing the search.

To build the index, an offline snapshot 232 is taken from the databases with the current user information. The offline snapshot 232 is then processed to standardize the ATS data 230 before the offline index build module 228 indexes the data to create the index.

The live data may include new data obtained by the online service from its members and new ATS data. An ATS stream 222 processes the ATS data sent by the recruiters' systems and makes the data available to the live updater 216. The live updater 216 makes the data available to the indexer 220 to update the index that may be used by the search workers 218 to perform the searches.

In some example embodiments, the events associated with the search are tracked 206. The events are used to develop metrics on the search results and how the unified search works. A first tracking event is named RecruiterSearchResultsServed, and the search broker 214 sends this event with the list of search results available.

Another event is named RecruiterSearchResultsImpression, and when the UI 202 renders a search result, the RecruiterSearchResultsImpression event will include the data for that search result (e.g., candidate information). For example, if three candidates are presented in the UI 202, there will be three corresponding RecruiterSearchResultsImpression events.

The relevance models 210 are used by the search broker to rank the results. The search workers 218 may also use the relevance models. More details on the relevance models are provided below with reference to FIG. 3.

Figure 3:
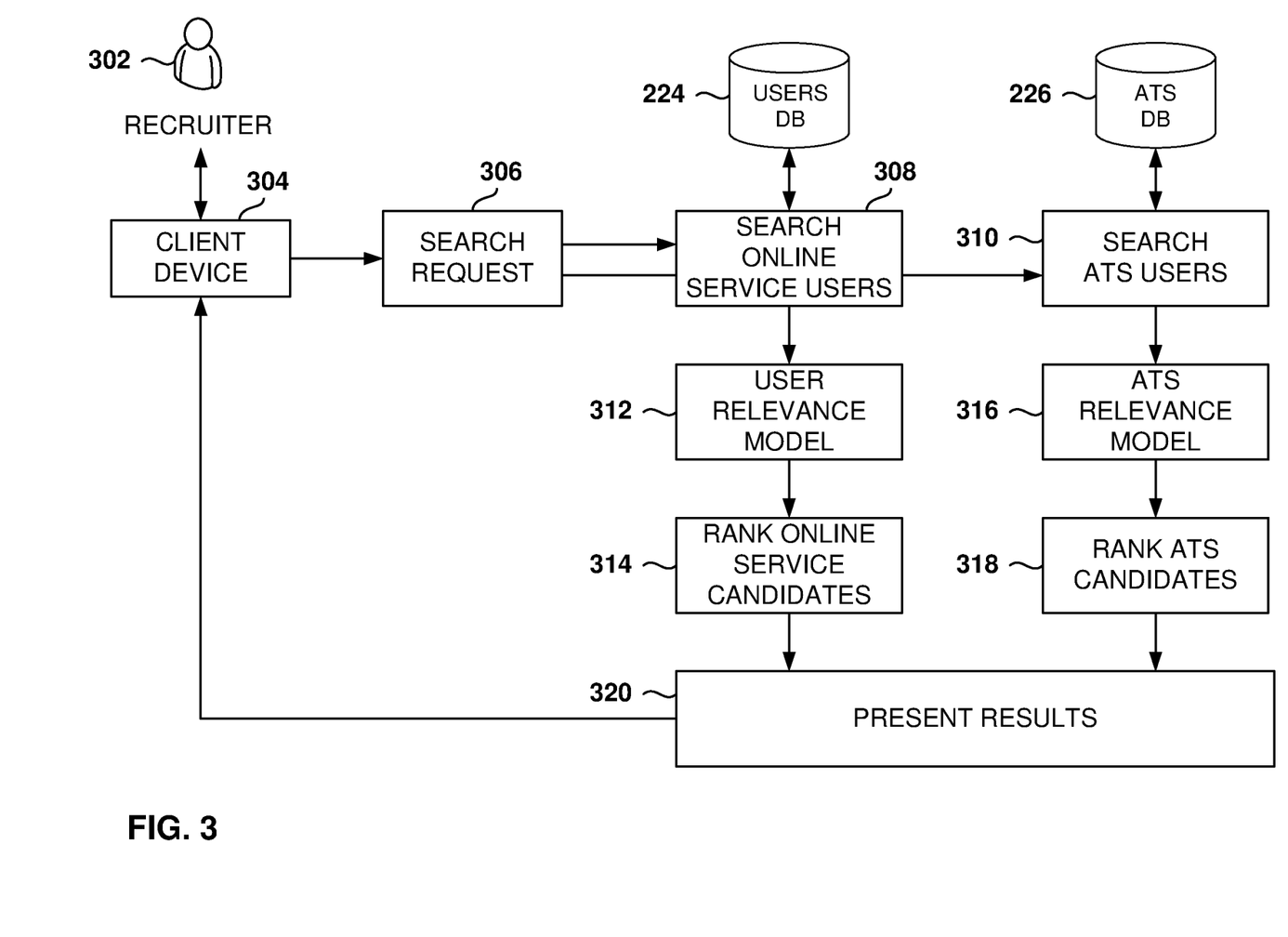
FIG. 3 is a flowchart of a method for simultaneous searching in two domains, according to some example embodiments.

FIG. 3 is a flowchart of a method for simultaneous searching in two domains, according to some example embodiments. The recruiter 302 interacts with a client device 304 that presents the UI 202. The search request 306 originates a search 308 of the online service users and a search 310 of the ATS users.

The searches generate results that are ranked by a user relevance model 312 for the online service users and by an ATS relevance model 316 for the ATS users. Typically, there is more information for the online service users than for the ATS users, depending on how much ATS data is downloaded. Since there are more features available for the online users, the user relevance model 312 will access a larger number of features, also referred to as labels. More details on the available features are provided below with reference to FIG. 7.

The online users will have available features from the user profile and the user activities on the online service, such as work experience over the member's career, education, contributions on the online service, job applications submitted, etc. For the ATS users, fewer features are usually available, such as current job, email, geographic location, and phone number. In one example embodiment, the relevance model uses the geographic location feature to rank the candidates that match the search criteria, but other embodiments may use additional features, such as education, title, and work history. In other example embodiments, the ATS model may include time the user was added to the ATS system, current company, current title, and geographic location.

However, the ATS data may also be rich, such as when the users provide a resume, so their work history is available for ranking and determining relevance to the search query. Further, the ATS relevance model may include additional features that are not present in the online service member profile, such as applied for a job directly at the recruiter's company.

At operation 314 the online service candidates are ranked by the user relevance model 312, and, at operation 318, the ATS candidates are ranked by the ATS relevance model 316. Further, at operation 320, the top results from both sets are presented in the UI of the client device 304.

It is noted, that in some embodiments, the same model may be used to rank both types of candidates, even though fewer features may be available for the ATS users. Over time, more data of the ATS candidates may become available, approaching the features available for members, and it is expected that the two models converge, which means that one model may be used to rank both sets of users.

Typically, the online service will have a much larger number of members than the ATS. By having separate searches and models, it is possible to make sure that the ATS candidates do not get lost with the results from the online service members, which may be much larger, such as a thousand times more results or more. Thus, the bias towards online service candidates is eliminated with the methods presented.

In some example embodiments, the search results from the two domains may be combined into a single list. To guarantee visibility to the ATS candidates, a minimum ratio of ATS candidates is set, e.g., one or more out of 8 candidates in the result list is an ATS candidate, as long as there are enough ATS results. In other embodiments, as discussed with reference to FIG. 1, the results are presented in separate lists.

Figure 4:
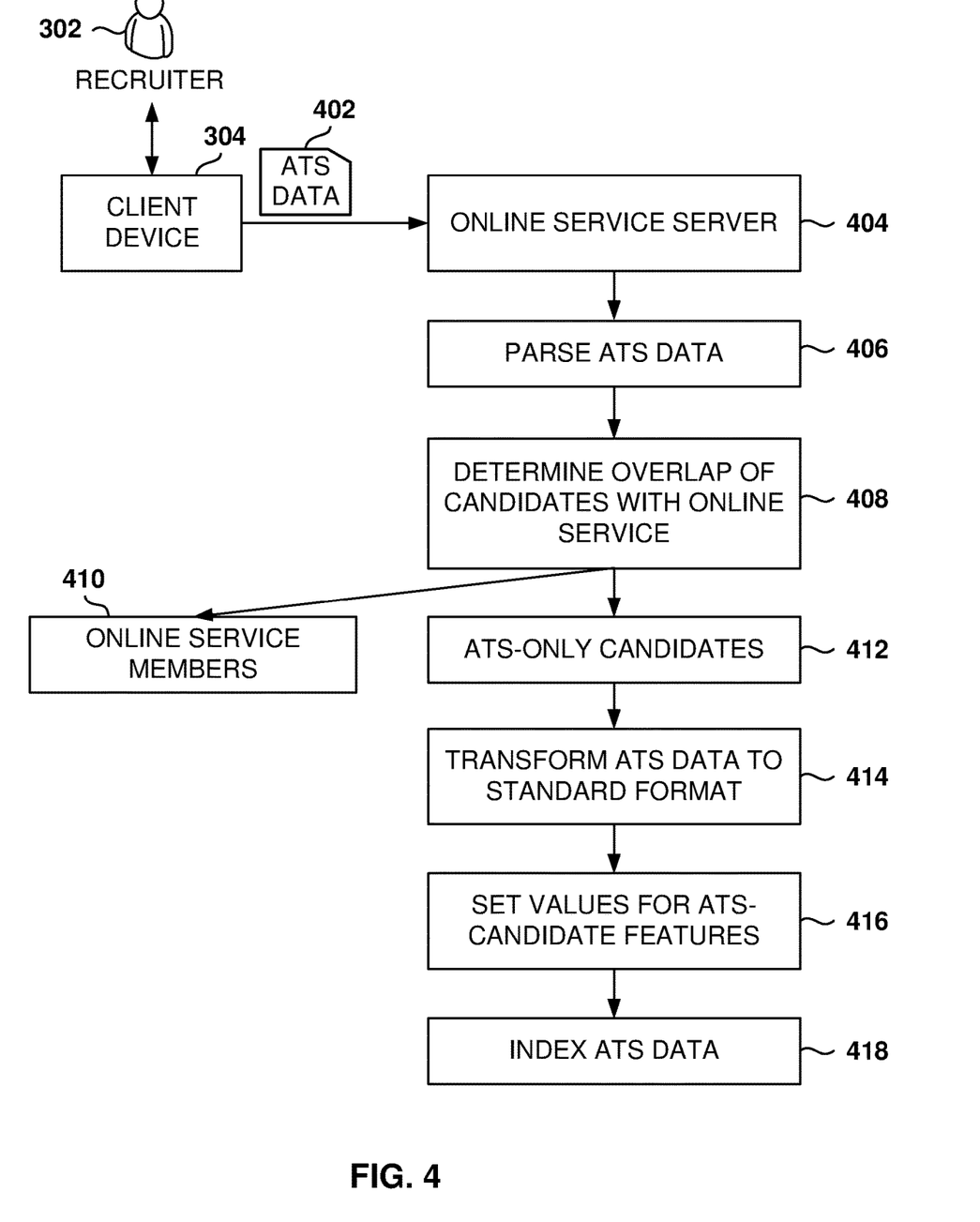
FIG. 4 illustrates the process for importing Applicant Tracking System (ATS) data, according to some example embodiments.

FIG. 4 illustrates the process for importing Applicant Tracking System (ATS) data 402, according to some example embodiments. While the various operations in this flowchart are presented and described sequentially, one of ordinary skill will appreciate that some or all of the operations may be executed in a different order, be combined or omitted, or be executed in parallel.

The ATS data 402 is downloaded from the client device 304 to online service server 404. At operation 406, the online service server 404 parses the ATS data, which includes determining the data included in the download for the different candidates of the ATS data, such as name, current company, current title, etc.

In some example embodiments, the API to upload ATS data includes the following fields:
- addresses: a list of the candidate's addresses (may be empty);
- atsCreatedAt: date that the record was created in ATS;
- atsLastModifiedAt: date the record was last updated in ATS;
- currentCompanyName: name of the candidate's current employer;
- currentJobTitle: candidate's current job title;
- emailAddresses: list of candidate's email addresses;
- externalProfileURL: link to the candidate in ATS;
- firstName: candidate's first name;
- lastName: candidate's last name;
- middleInitial: candidate's middle initial; and
- phoneNumbers: list of the candidate's phone numbers.

The API call may provide values for all or a subset of these fields. At operation 408, the online service server determines the overlap of the ATS candidates with the online service members. In some example embodiments, the email and phone number are used to determine the overlap, but other fields may also be used, such as last name, residence, etc.

Thus, some of the ATS data may include data for online service members 410 that are already on the online service and for candidates that are only in the ATS data 402 but not in the online service. That is, the online server determines the overlap between online service members and ATS candidates in the ATS data 402.

At operation 414, the data for the ATS-only candidates 412 is standardized to place the data in the same format as the online member data. This way, the search may be performed with the same tools for the two sets of users. In other example embodiments, the ATS data does not have the same format as for the online members, and the ATS-candidate search uses the standard format for ATS candidates. More details regarding standardization of the ATS data are provided below with reference to FIG. 5.

At operation 416, the values for the ATS-candidate features are set based on the standardized data, so the ATS data may be indexed at operation 418. For example, the ATS data may be indexed for first name, last name, job title, geographic location, etc., or any combination thereof. Additionally, additional fields associated with the ATS data may also be indexed. In some example embodiments, the data is indexed for all search parameters provided in the example of FIG. 1.

Figure 5:
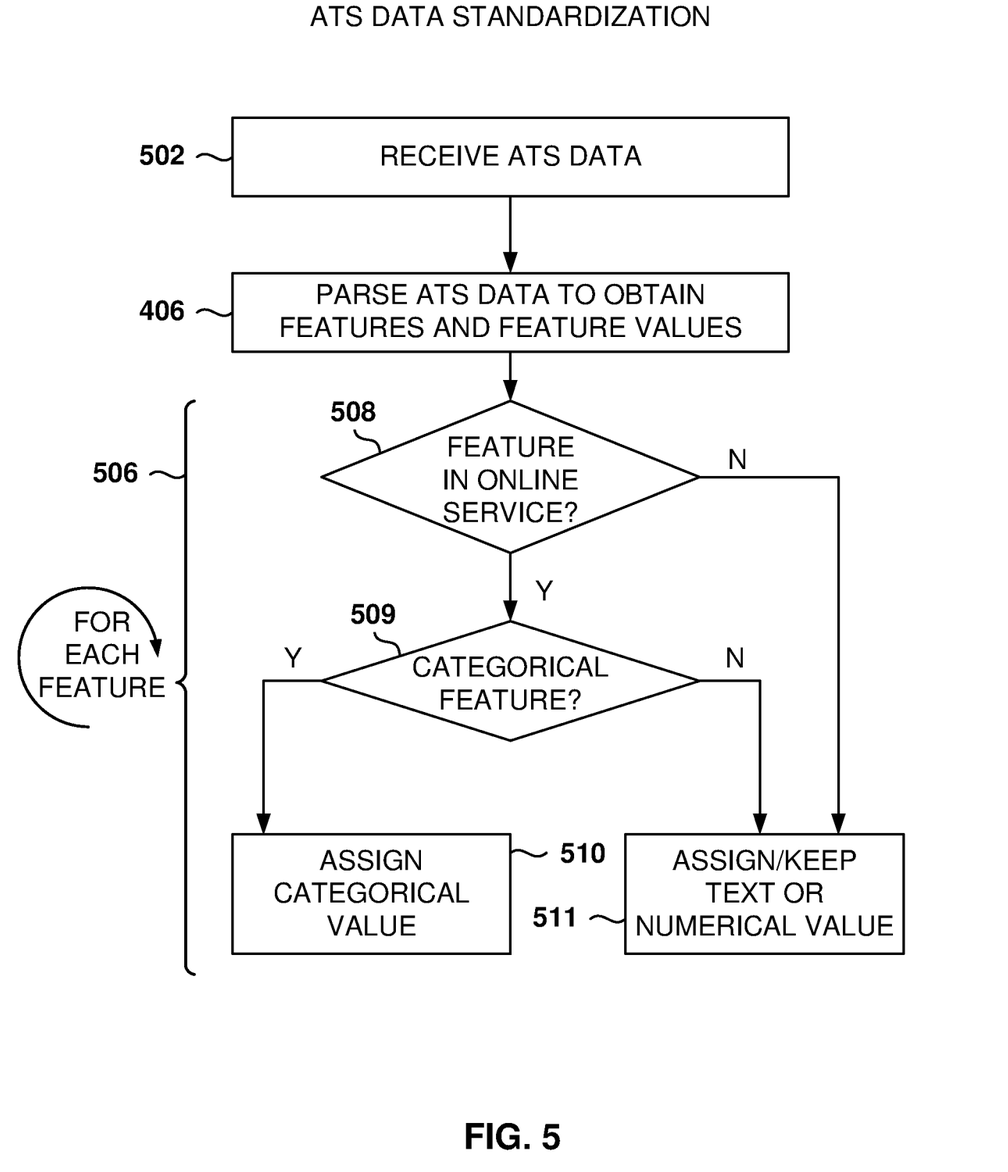
FIG. 5 is a flowchart of a method for ATS-data standardization, according to some example embodiments.

FIG. 5 is a flowchart of a method for ATS-data standardization, according to some example embodiments. While the various operations in this flowchart are presented and described sequentially, one of ordinary skill will appreciate that some or all of the operations may be executed in a different order, be combined or omitted, or be executed in parallel.

At operation 502, the ATS data is received by the online service server, and at operation 406, the ATS data is parsed, as described above with reference to FIG. 4. Different features are identified in the ATS data, such as name, email addresses, phone numbers, job title, etc.

For each feature of the ATS data, operation 506 is performed, which includes operations 508-511. At operation 508, a check is made to determine if the feature is also included in the member data of the online service. If the feature is part of the online service profile data, the method flows to operation 509, and to operation 511 otherwise.

At operation 509, a check is made to determine if the feature is a categorical feature. A categorical feature is a feature assigned to a category that may include a predefined number of possible values. For example, titles may be categorized in the online service, and each title is assigned an ID. Titles that are similar or equivalent (e.g., software engineer, software developer) may be assigned the same categorical title with the same ID. Non-categorical features may include free form text strings or numerical values.

If the feature is for a categorical value, the value of the feature for the ATS data is assigned, at operation 510, the corresponding categorical value in the same fashion as the categorical values are assigned within the online service. At operation 511, values that are not categorical values are assigned the text or numerical value from the ATS data.

One example of categorical value is the geographic location. Each country is divided into geographical areas, and each geographical area is assigned a corresponding identifier (ID). Other categorical values may include the job title and the company. A non-categorical feature may be text sent by the candidate as an introduction when applying for the job.

Figure 6:
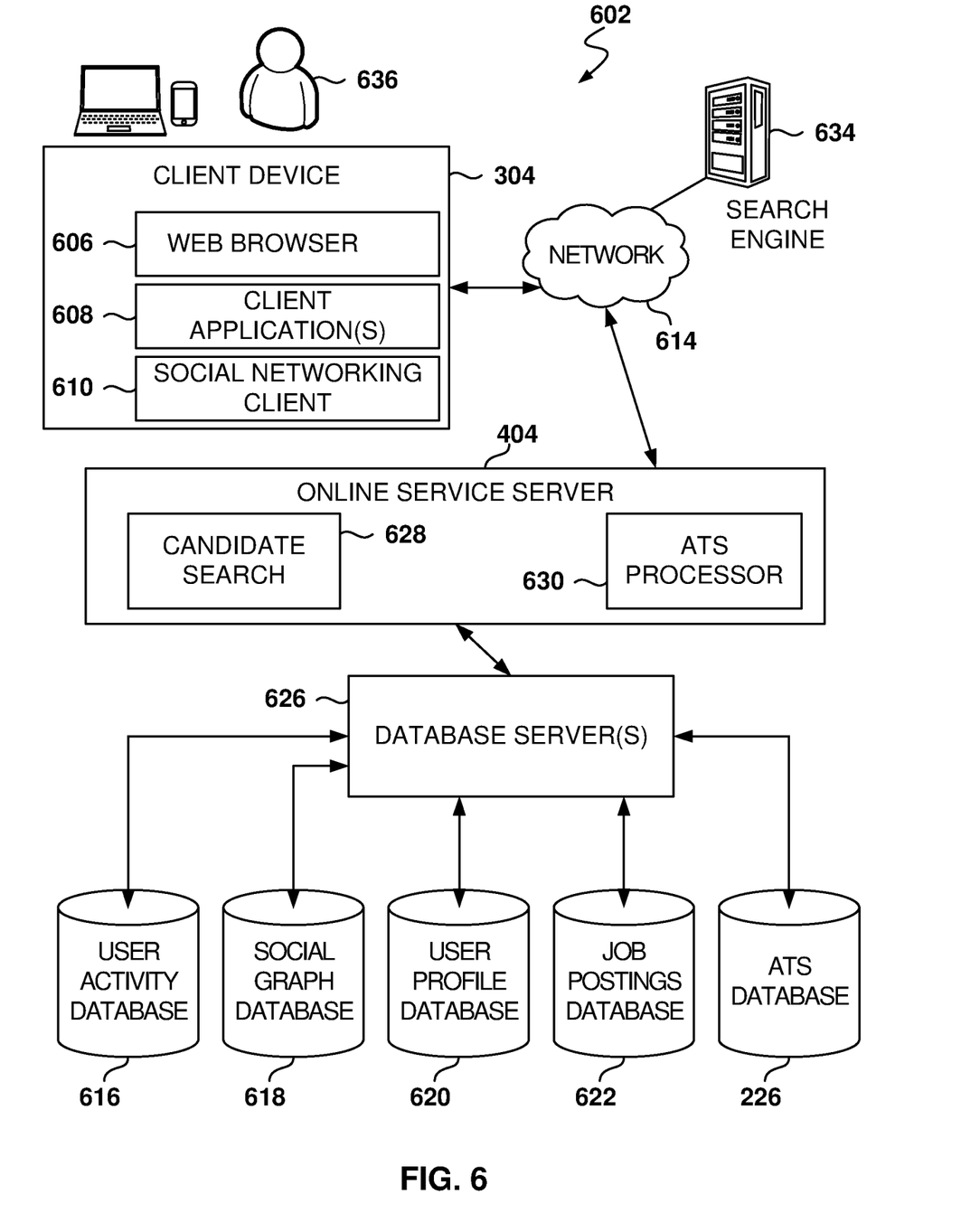
FIG. 6 is a high-level block diagram of a networked system illustrating an example embodiment of a client-server-based network architecture.

FIG. 6 is a high-level block diagram of a networked system illustrating an example embodiment of a client-server-based network architecture 602. Embodiments are presented with reference to an online service, and, in some example embodiments, the online service is a social networking service.

An online service server 404 provides server-side functionality via a network 614 (e.g., the Internet or a wide area network (WAN)) to one or more client devices 304. FIG. 6 illustrates, for example, a web browser 606, client application(s) 608, and a social networking client 610 executing on a client device 304. The online service server 404 is further communicatively coupled with one or more database servers 626 that provide access to one or more databases 616-622 and 226.

The online service server 404 includes, among other modules, a candidate search module 628 and an ATS processor 630. The candidate search module 628 performs searches for possible candidates for a job posting, including searches for online service members and ATS candidates. The ATS processor 630 handlers ATS operations, such as providing an API to import data and a UI for performing ATS-related operations within the online service.

The client device 304 may comprise, but is not limited to, a mobile phone, a desktop computer, a laptop, a tablet, a netbook, a multi-processor system, a microprocessor-based or programmable consumer electronic system, or any other communication device that a user 636 may utilize to access the online service server 404. In some embodiments, the client device 304 may comprise a display module (not shown) to display information (e.g., in the form of user interfaces).

In one embodiment, the online service server 404 is a network-based appliance that responds to initialization requests or search queries from the client device 304. One or more users 636 may be a person, a machine, or other means of interacting with the client device 304. In various embodiments, the user 636 interacts with the network architecture 602 via the client device 304 or another means.

The client device 304 may include one or more applications (also referred to as "apps") such as, but not limited to, the web browser 606, the social networking client 610, and other client applications 608, such as a messaging application, an electronic mail (email) application, a news application, and the like. In some embodiments, if the social networking client 610 is present in the client device 304, then the social networking client 610 is configured to locally provide the user interface for the application and to communicate with the online service server 404, on an as-needed basis, for data and/or processing capabilities not locally available (e.g., to access a user profile, to authenticate a user 636, to identify or locate other connected users 636, etc.). Conversely, if the social networking client 610 is not included in the client device 304, the client device 304 may use the web browser 606 to access the online service server 404.

In addition to the client device 304, the online service server 404 communicates with the one or more database servers 626 and databases 616-622 and 226. In one example embodiment, the online service server 404 is communicatively coupled to a user activity database 616, a social graph database 618, a user profile database 620, a job postings database 622, and the ATS database 226. The databases 616-622 and 226 may be implemented as one or more types of databases including, but not limited to, a hierarchical database, a relational database, an object-oriented database, one or more flat files, or combinations thereof.

The user profile database 620 stores user profile information about users 636 who have registered with the online service server 404. With regard to the user profile database 620, the user 636 may be an individual person or an organization, such as a company, a corporation, a nonprofit organization, an educational institution, or other such organizations.

In some example embodiments, when a user 636 initially registers to become a user 636 of the social networking service provided by the online service server 404, the user 636 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 620. Similarly, when a representative of an organization initially registers the organization with the social networking service provided by the online service server 404, the representative may be prompted to provide certain information about the organization, such as a company industry.

As users 636 interact with the social networking service provided by the online service server 404, the online service server 404 is configured to monitor these interactions. Examples of interactions include, but are not limited to, commenting on posts entered by other users 636, viewing user profiles, editing or viewing a user 636's own profile, sharing content outside of the social networking service (e.g., an article provided by an entity other than the online service server 404), updating a current status, posting content for other users 636 to view and comment on, posting job suggestions for the users 636, searching job postings, and other such interactions. In one embodiment, records of these interactions are stored in the user activity database 616, which associates interactions made by a user 636 with his or her user profile stored in the user profile database 620.

The job postings database 622 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database servers 626 is illustrated as a single block, one of ordinary skill in the art will recognize that the database server 626 may include one or more such servers.

The network architecture 602 may also include a search engine 634. Although only one search engine 634 is depicted, the network architecture 602 may include multiple search engines 634. Thus, the online service server 404 may retrieve search results (and, potentially, other data) from multiple search engines 634. The search engine 634 may be a third-party search engine.

Figure 7:
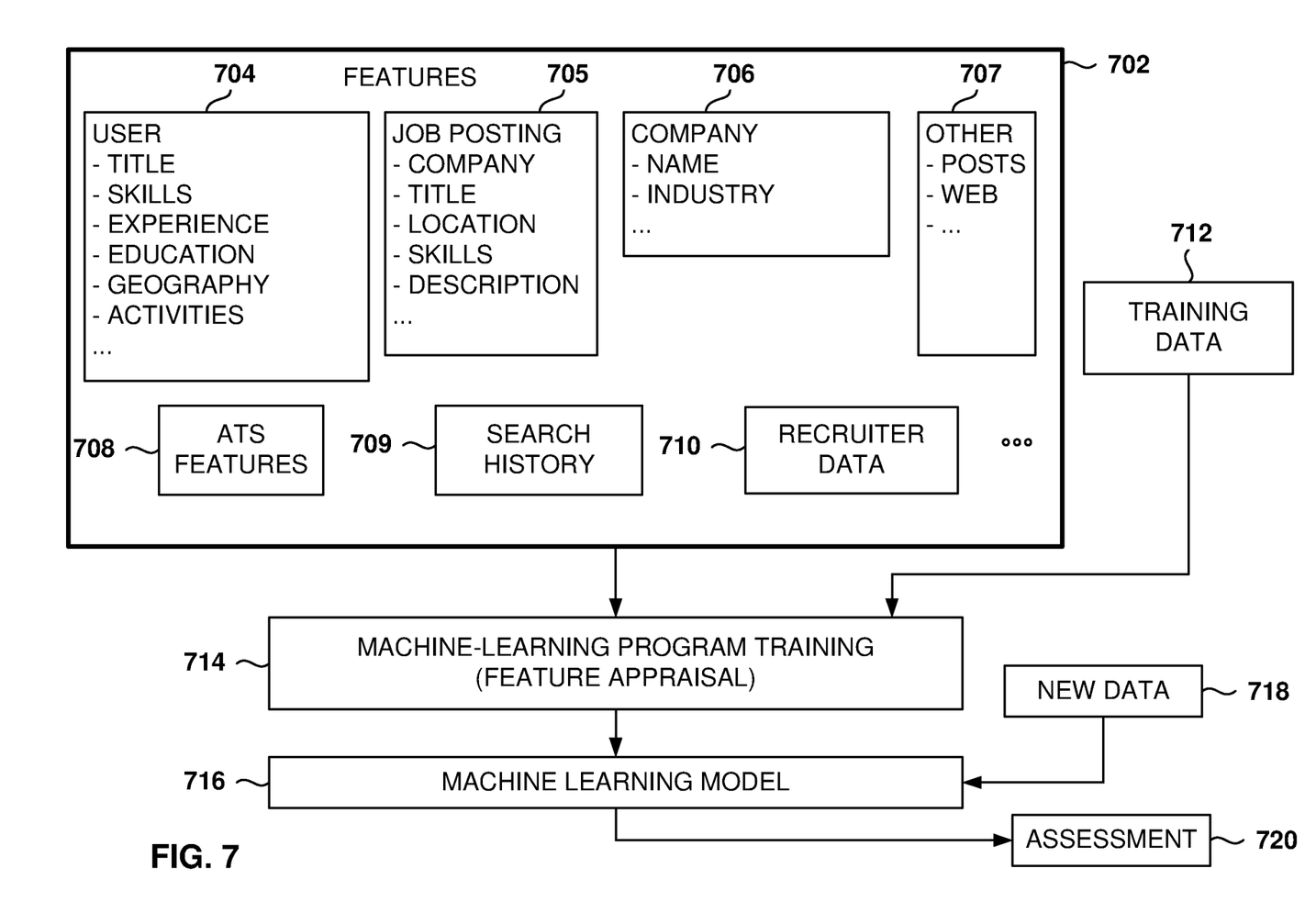
FIG. 7 illustrates the training and use of a machine-learning program, according to some example embodiments.

FIG. 7 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 712 to find correlations among identified features 702 that affect the outcome.

The machine-learning algorithms utilize features 702 for analyzing the data to generate assessments 720. A feature 702 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as categorical, numeric, strings, and graphs. A categorical feature is a feature that may be assigned a value from a plurality of predetermined possible values (e.g., this animal is a dog, a cat, or a bird).

In one example embodiment, the features 702 may be of different types and may include one or more of user features 704, job-posting features 705, company features 706, other features 707 (e.g., user posts, web activity, followed companies, etc.), ATS features 708 (features derived from the imported ATS data such as name, title, email address, phone number, etc.), search history 709, and recruiter data 710 (e.g., job openings, job applications, InMails).

The user features 704 include user profile information, such as title, skills, experience, education, geography, activities of the user in the online service, etc. The job posting features 705 include information about job postings, such as company offering the job, title of the job post, location of the job post, skills required, description of the job, etc. Further, the company features 706 include information about the company posting the job, such as name of the company, industry, revenue information, locations, etc. The user features used for the different relevance models may use different sets of features based on what data is available for the given domain.

The ML algorithms utilize the training data 712 to find correlations among the identified features 702 that affect the outcome or assessment 720. In some example embodiments, the training data 712 includes known data, obtained from past activities of recruiters and members in the online system, such as user responses to requests from recruiters, job applications, job openings, saved candidates by recruiters, etc.

With the training data 712 and the identified features 702, the ML algorithm is trained at operation 714. The ML training appraises the value of the features 702 as they correlate to the training data 712. The result of the training is the ML model 716.

When the acceptance ML model 716 is used to perform an assessment, new data 718 is provided as an input to the acceptance ML model 716, and the acceptance ML model 716 generates the assessment 720 as output. For example, the acceptance ML model 716 may be used to obtain the relevance (e.g., score of a member) for a given search. Different ML models 716 may be used for obtaining the relevance score of online service members and ATS candidates.

Figure 8:
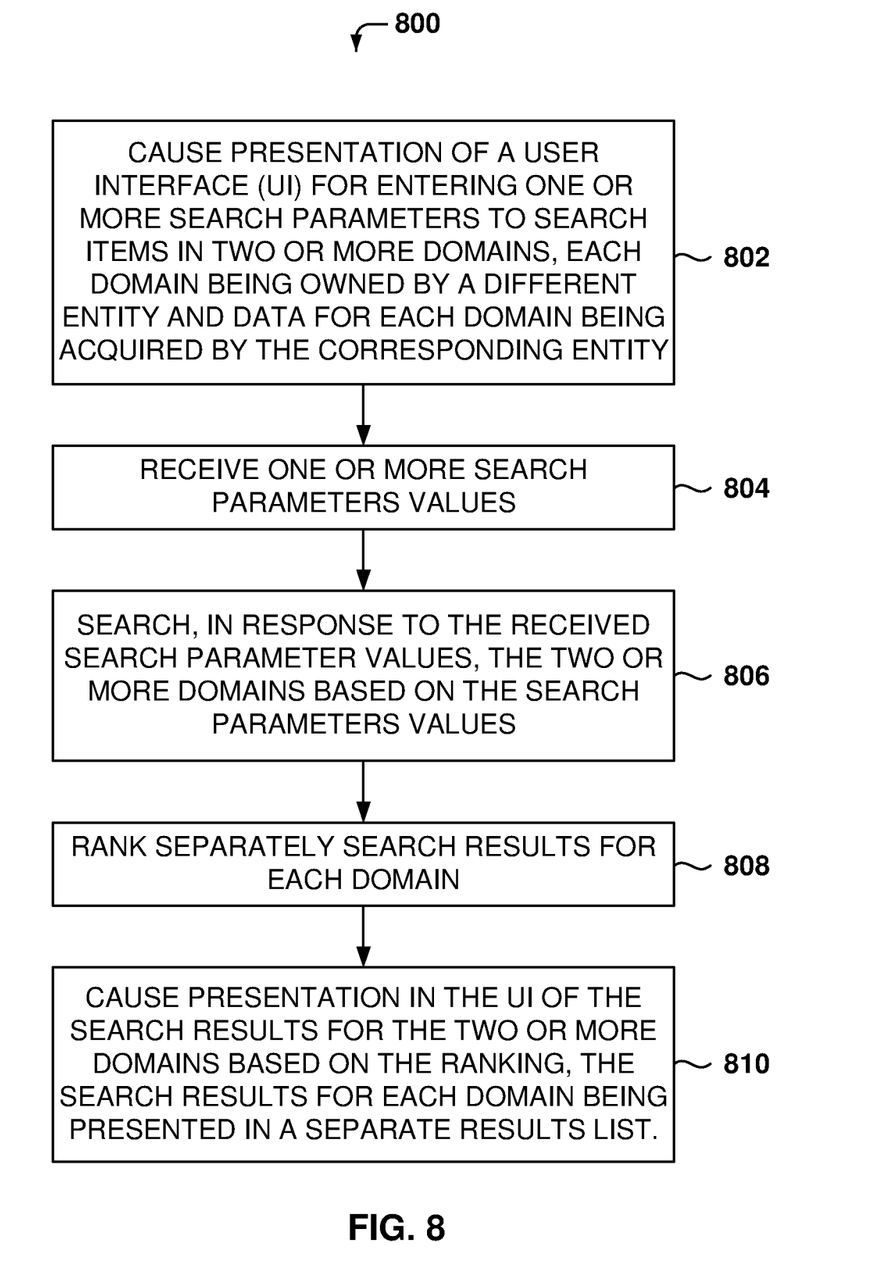
FIG. 8 is a flowchart of a method for providing a unified search tool for searching data in multiple domains, according to some example embodiments.

FIG. 8 is a flowchart of a method 800 for providing a unified search tool for searching data in multiple domains, according to some example embodiments. While the various operations in this flowchart are presented and described sequentially, one of ordinary skill will appreciate that some or all of the operations may be executed in a different order, be combined or omitted, or be executed in parallel.

Operation 802 is for causing presentation, by one or more processors, of the UI for entering one or more search parameters to search items in two or more domains. Each domain is owned by a different entity and data for each domain is acquired by the corresponding entity. In one aspect, the two or more domains comprise a first domain for member information for an online service and a second domain for an applicant tracking system (ATS).

From operation 802, the method 800 flows to operation 804 for receiving, by the one or more processors, one or more search parameters values.

From operation 804, the method 800 flows to operation 806 for searching, in response to the received search parameter values, the two or more domains based on the search parameters values.

Further, from operation 806, the method 800 flows to operation 808 where the one or more processors rank separately search results for each domain.

From operation 808, the method 800 flows to operation 810 for causing presentation in the UI of the search results for the two or more domains based on the ranking. The search results for each domain are presented in a separate results list.

In one example, the method 800 further comprises downloading, by a server of the first domain, data from the ATS of the second domain; and determining, by the server of the first domain, overlap between the data from the online service and the ATS, wherein the searching for the second domain includes searching, by the server of the first domain, the downloaded ATS data from the second domain for items that do not overlap with the first domain.

In one example, the method 800 further comprises parsing the downloaded data from the second domain, and standardizing the parsed data to match formatting of features in the first domain.

In one example, the ranking comprises ranking search results from the first domain using a first machine-learning relevance model, and ranking search results from the second domain using a second machine-learning relevance model different from the first machine-learning relevance model.

In one example, the first relevance model is based on features comprising name, title, skills, education, geographic region, and recruiter data.

In one example, the second relevance model is based on features comprising name, phone number, email, and geographic region.

In one example, the method 800 further comprises generating a first index for the two or more domains comprising an offline snapshot, and generating a second index for the two or more domains comprising new data obtained after generating the first index.

In one example, the UI includes a first list of results associated with the first domain for the online service and a second list of results associated with the second domain for the ATS.

In one example, the method 800 further comprises providing, by a server of a first domain, a widget for invoking the UI from a computer system of a second domain.

In one example, the searching is performed by a search cluster comprising: a search broker to divide the search into multiple search tasks, a plurality of workers to perform the multiple search tasks, and a live updater for processing data received since an index was created.

Another general aspect is for a system that includes a memory comprising instructions and one or more computer processors. The instructions, when executed by the one or more computer processors, cause the one or more computer processors to perform operations comprising: causing presentation of a user interface (UI) for entering one or more search parameters to search items in two or more domains, each domain being owned by a different entity and data for each domain being acquired by the corresponding entity, wherein the two or more domains comprise a first domain for member information for an online service and a second domain for an applicant tracking system (ATS); receiving one or more search parameters values; searching, in response to the received search parameter values, the two or more domains based on the search parameters values; ranking separately search results for each domain; and causing presentation in the UI of the search results for the two or more domains based on the ranking, the search results for each domain being presented in a separate results list.

In yet another general aspect, a machine-readable storage medium (e.g., a non-transitory storage medium) includes instructions that, when executed by a machine, cause the machine to perform operations comprising: causing presentation of a user interface (UI) for entering one or more search parameters to search items in two or more domains, each domain being owned by a different entity and data for each domain being acquired by the corresponding entity, wherein the two or more domains comprise a first domain for member information for an online service and a second domain for an applicant tracking system (ATS); receiving one or more search parameters values; searching, in response to the received search parameter values, the two or more domains based on the search parameters values; ranking separately search results for each domain; and causing presentation in the UI of the search results for the two or more domains based on the ranking, the search results for each domain being presented in a separate results list.

Figure 9:
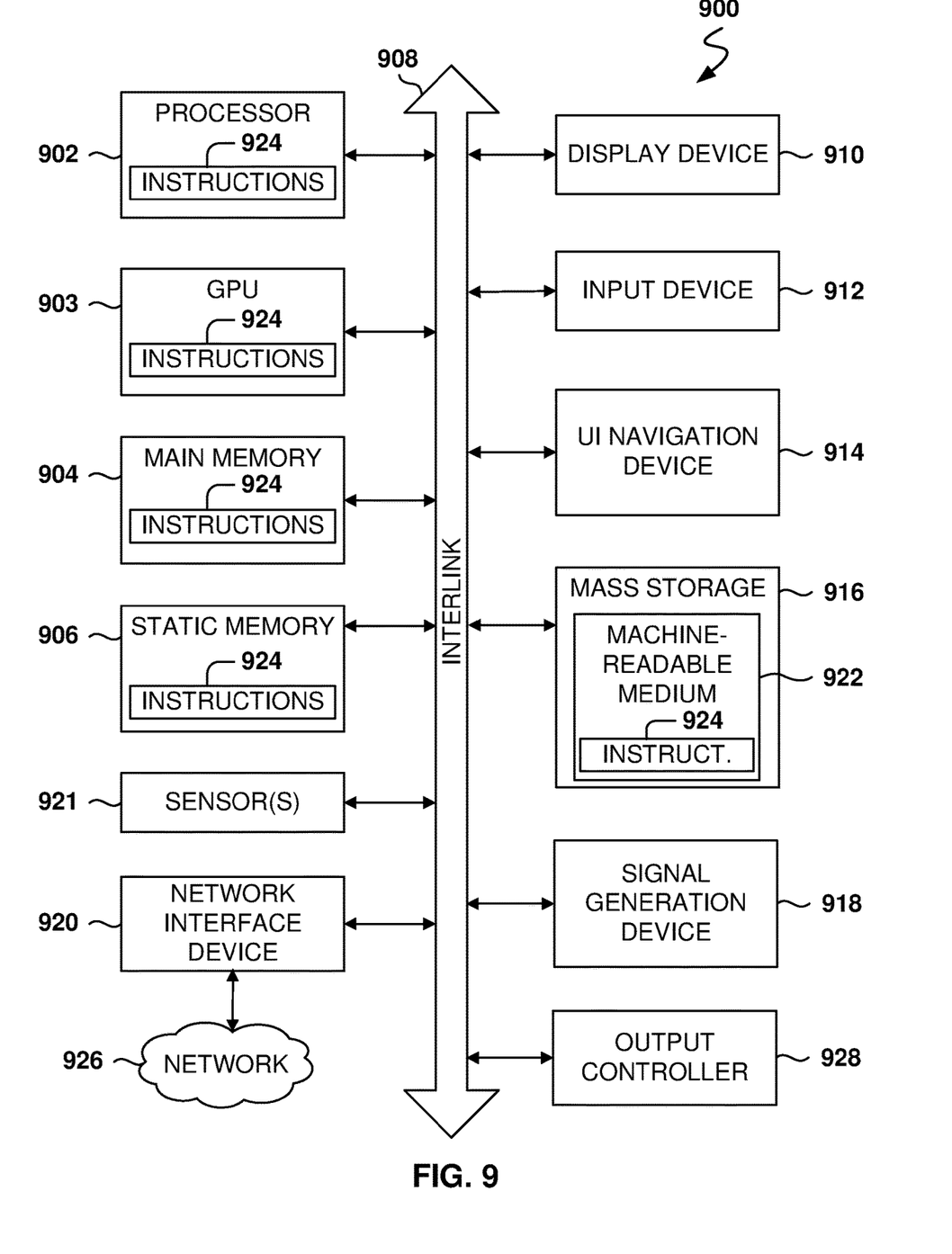
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink 908 (e.g., bus). The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    causing, by one or more processors, presentation of a unified user interface (UI) for entering one or more search parameter values to search for candidates in two or more databases, each database being operated by a different entity and storing data acquired by the corresponding entity, wherein the two or more databases comprise a first database storing member profile data for an online service and a second database storing applicant data for an applicant tracking system (ATS);
    receiving, by the one or more processors, a query with the one or more search parameter values;
    searching, by the online service, the first database using the query to obtain first search results comprising a plurality of member profiles;
    sending, over a network to an ATS server, a search request based on the query to search the second database to obtain second search results comprising a plurality of ATS candidates;
    ranking, by the one or more processors, separately the first search results, comprising the member profiles, and the second search results, comprising the ATS candidates, by:
    ranking the first search results using a first machine-learning relevance model; and
    ranking the second search results using a second machine-learning relevance model that is different from the first machine-learning relevance model; and
    causing presentation in the UI of the first search results and the second search results in separate lists and ordered based on their corresponding rankings.

2. The method as recited in claim 1, further comprising:
    downloading, by a server of the online service, the second search results from the ATS; and
    determining, by the server, overlap between the search results from the online service and the second search results from the ATS; and
    searching, by the server, the downloaded second search results from the ATS for candidates that do not overlap with member profiles from the first database.

3. The method as recited in claim 2, further comprising:
    parsing the downloaded second search results from the ATS; and
    standardizing the parsed second search results to match formatting of features in the first database.

4. The method as recited in claim 1, wherein the first machine-learning relevance model is based on features comprising name, title, skills, education, geographic region, and recruiter data.

5. The method as recited in claim 1, wherein the second machine-learning relevance model is based on features comprising name, phone number, email, and geographic region.

6. The method as recited in claim 1, wherein the UI includes a first list of the first search results associated with the first database for the online service and a second list of the second search results associated with the second database for the ATS.

7. The method as recited in claim 1, further comprising:
    providing, by a server of the online service, a widget for invoking the UI from a computer system.

8. The method as recited in claim 1, wherein the searching is performed by a search cluster comprising:
    a search broker to divide the search into multiple search tasks;
    a plurality of workers to perform the multiple search tasks; and
    a live updater for processing data received since an index was created.

9. A system comprising:
    a memory comprising instructions; and
    one or more computer processors, wherein the instructions, when executed by the one or more computer processors, cause the system to perform operations comprising:
    causing presentation of a unified user interface (UI) for entering one or more search parameter values to search for candidates in two or more databases, each database being operated by a different entity and storing data acquired by the corresponding entity, wherein the two or more databases comprise a first database storing member profile data for an online service and a second database storing applicant data for an applicant tracking system (ATS);
    receiving a query with the one or more search parameter values;
    searching, by the online service, the first database using the query to obtain first search results comprising a plurality of member profiles;
    sending, over a network to an ATS server, a search request based on the query to search the second database to obtain second search results comprising a plurality of ATS candidates;

ranking, by the one or more processors, separately the first search results, comprising the member profiles, and the second search results, comprising the ATS candidates, by:
  ranking the first search results using a first machine-learning relevance model; and
  ranking the second search results using a second machine-learning relevance model that is different from the first machine-learning relevance model; and
  causing presentation in the UI of the first search results and the second search results in separate lists and ordered based on their corresponding rankings.

10. The system as recited in claim 9, wherein the instructions further cause the one or more computer processors to perform operations comprising:
  downloading, by a server of the online service, the second search results from the ATS; and
  determining, by the server, overlap between the search results from the online service and the second search results from the ATS; and
  searching, by the server, the downloaded second search results from the ATS for candidates that do not overlap with member profiles from the first database.

11. The system as recited in claim 10, wherein the instructions further cause the one or more computer processors to perform operations comprising:
  parsing the downloaded second search results from the ATS; and
  standardizing the parsed second search results to match formatting of features in the first database.

12. The system as recited in claim 9, wherein the first machine-learning relevance model is based on features comprising name, title, skills, education, geographic region, and recruiter data; wherein the second machine-learning relevance model is based on features comprising name, phone number, email, and geographic region.

13. A tangible machine-readable storage medium including instructions that, when executed by a machine, cause the machine to perform operations comprising:
  causing presentation of a unified user interface (UI) for entering one or more search parameter values to search for candidates in two or more databases, each database being operated by a different entity and storing data acquired by the corresponding entity, wherein the two or more databases comprise a first database storing member profile data for an online service and a second database storing applicant data for an applicant tracking system (ATS);
  receiving a query with the one or more search parameter values;
  searching, by the online service, the first database using the query to obtain first search results comprising a plurality of member profiles;
  sending, over a network to an ATS server, a search request based on the query to search the second database to obtain second search results comprising a plurality of ATS candidates;
  ranking separately the first search results, comprising the member profiles, and the second search results, comprising the ATS candidates, by:
    ranking the first search results using a first machine-learning relevance model; and
    ranking the second search results using a second machine-learning relevance model that is different from the first machine-learning relevance model; and
  causing presentation in the UI of the first search results and the second search results in separate lists and ordered based on their corresponding rankings.

14. The tangible machine-readable storage medium as recited in claim 13, wherein the machine further performs operations comprising:
  downloading, by a server of the online service, the second search results from the ATS; and
  determining, by the server, overlap between the search results from the online service and the second search results from the ATS; and
  searching, by the server, the downloaded second search results from the ATS for candidates that do not overlap with member profiles from the first database.

15. The tangible machine-readable storage medium as recited in claim 14, wherein the machine further performs operations comprising:
  parsing the downloaded second search results from the ATS; and
  standardizing the parsed second search results to match formatting of features in the first database.

16. The tangible machine-readable storage medium as recited in claim 13, wherein the first machine-learning relevance model is based on features comprising name, title, skills, education, geographic region, and recruiter data; wherein the second machine-learning relevance model is based on features comprising name, phone number, email, and geographic region.

* * * * *